United States Patent [19]

Prasse et al.

[11] 3,921,988

[45] Nov. 25, 1975

[54] PISTON AND RESILIENT PLASTIC PISTON RING COMBINATION

[75] Inventors: Herbert F. Prasse; Harold E. McCormick, both of Ballwin, Mo.

[73] Assignee: Ramsey Corporation (TRW Inc.), Cleveland, Ohio

[22] Filed: Sept. 17, 1973

[21] Appl. No.: 398,192

Related U.S. Application Data

[62] Division of Ser. No. 134,985, April 19, 1971, which is a division of Ser. No. 16,278, March 4, 1971, Pat. No. 3,608,911.

[52] U.S. Cl. .......... 277/168

[51] Int. Cl.[2] .......... F16J 9/00

[58] Field of Search ........ 277/168, 206.1, 169, 170, 277/205

[56] References Cited

UNITED STATES PATENTS

| | | | |
|---|---|---|---|
| 1,534,198 | 4/1925 | Wilson | 277/170 |
| 2,474,132 | 6/1949 | Vernet | 277/170 |
| 3,167,323 | 1/1965 | Appleton et al. | 277/205 |
| 3,183,008 | 5/1965 | Yost | 277/227 |
| 3,563,558 | 2/1971 | Doutt | 277/205 |

*Primary Examiner*—Samuel B. Rothberg

[57] ABSTRACT

A piston and plastic piston ring combination for internal combustion engines. In a preferred embodiment, the ring has an outer diameter lip for engaging the cylinder wall, an inner diameter portion bottomed in the ring groove of the piston, and an axial groove intermediate the outer diameter lip and the inner diameter portion whereby combustion gases will act in the groove to expand the inner diameter into sealing contact with the bottom of the ring groove and expand the outer diameter lip into sealing engagement with the cylinder wall.

8 Claims, 7 Drawing Figures

109
105
93
90
91
100a
108
107
106

98
97
90
96
93
94

91
100
99
95
108
101
102

122
120
123
121
136

126
130
127
129
125

121
122
135
132
126
127
138
123
131
130
129
139
125
134
128
140
124
120

151
150
156
152
155
153
154

159
160
158
162
161

PISTON AND RESILIENT PLASTIC PISTON RING COMBINATION

CROSS-REFERENCE TO RELATED APPLICATIONS

This is a division, of application Ser. No. 134,985, filed Apr. 19, 1971, a division of Ser. No. 16,278, filed Mar. 4, 1971, now U.S. Pat. No. 3,608,911.

BACKGROUND OF THE INVENTION

1. Field of the Invention

This invention relates to internal combustion engines and more particularly to a piston ring for use in such engines.

2. Prior Art

Recently, more emphasis has been placed upon controlling internal combustion engine emissions. It has been determined that a significant quantity of undesirable emissions as well as power loss are the result of combustion blowby. Such blowby occurs between the outer diameter of the piston and the cylinder wall. While compression rings, carried by the piston in ring grooves, have been used to seal this space, the prior art rings and ring sets do not completely seal the firing chamber.

It has been further suggested that the piston ring be made substantially L-shaped, as in the U.S. Pat. Nos. to R. S. Moore, No. 1,159,066 and Goetze, No. 2,844,424, with one leg of the L engaging the cylinder wall while the other leg is retained in the ring groove. In such constructions, the force of the entrapped combustion gases is used to expand, circumferentially, the first leg into tighter engagement with the cylinder wall. While such rings may be effective in reducing blowby between the ring and the cylinder wall, they are not effective in preventing the escape of such gas through the ring groove. Further, because such rings are historically of split annular construction, a considerable amount of gas can escape in the area of the ring gap.

SUMMARY OF THE INVENTION

Our invention overcomes the disadvantages of the prior art by providing a resilient plastic piston ring which utilizes the pressure of the entrapped gas. Because the ring relies upon the pressure of entrapped gas to provide the expansion force, friction is reduced during those portions of the engine cycle while either the pressure retained is reduced, as during exhaust, or where there is no pressure retained as during intake.

In a preferred embodiment, the ring is tightly U-shaped with one leg of the U being radially thinner and axially shorter than the other.

In the primary embodiment, the resilient plastic piston ring of this invention is used without a standard piston ring and has its outer diameter adapted to contact the cylinder wall. The ring is seated against the bottom of the ring groove and is preferably used in a groove immediately adjacent the top of the piston to control blowby or may be used in a lower groove, in an inverted position, to function as an oil control ring.

In yet another embodiment, the ring is bottomed in the ring groove and has a slanted outer diameter face adapted to engage the cylinder wall, a portion of the outer periphery extending below the normal ring groove depth in a secondary curved cutback groove.

In each instance the ring is preferably made of a high temperature resilient plastic such as Vespel (Reg.

trademark of E. I. duPont de Nemours & Co. for a polyimide resin), Teflon (Reg. trademark for a polytetrafluoroethylene manufactured by E. I. duPont de Nemours & Co.), or one of the hightemperature aromatic polyimides. Although the ring is preferably a 360° continuous ring, specific materials may require the use of a split ring for specific applications.

In those instances where the plastic ring does not contact the wall of the combustion cylinder, in addition to the above-mentioned high temperature plastics, a high temperature fluoroelastomer may be used such as Viton (Reg. trademark of E. I. duPont de Nemours & Co. for a fluoroelastomer).

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Although many advances have been made in the design of piston rings, with the increasing use of high-performance engines and the increasing combustion pressures encountered therein, conventional piston rings still allow a significant amount of the combustion gases to escape from the combustion area by traversing the path between the piston head and cylinder wall. Some of this escapage occurs between the outer diameter of the rings and the cylinder wall. A large amount also occurs by passage of gas around the piston ring in the ring groove. It is the purpose of this invention to minimize such gas blowby.

The piston rings of the present invention are constructed of a high-temperature plastic and preferably of plastics such as the polyimides which are relatively stable at the temperatures encountered in an internal combustion engine. An acceptable plastic for use in constructing the rings is known as Vespel, a registered trademark of the du Pont corporation. Such plastics are capable of continuous operation at temperatures of up to 500°F. and intermittent temperature exposures up to 900°F.

The rings are preferably constructed of material which has an elastic memory so that the rings may be constructed as a continuous 360° rings. When so constructed, the rings are stretched to be fittable over the piston head and thereafter shrunk to its normal diameter within the ring groove. In lower ring groove applications, plastic materials such as Teflon (a registered trademark of the E. I. du Pont de Nemours & Co.) may be utilized. Where the elastic memory of the material is such as to be undesirable for the stretching and shrink fit insertion into the ring groove, the ring may be split to facilitate installation. It is to be understood that although different materials may be used, the preferred material is a material such as Vespel or Viton. Viton is a fluoroelastomer which in commercial embodiments such as Viton A or Viton B exhibits the desired properties of high temperature stability and flexibility. Further, the material must be resilient at the operating temperatures encountered in the ring groove and should have self-lubricating properties.

Figure 1:
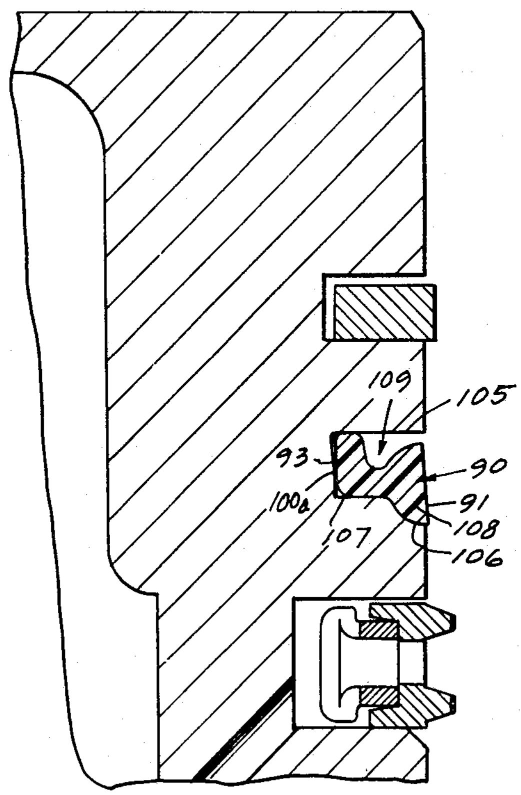
FIG. 1 is a fragmentary cross-sectional view of a piston equipped with one of the embodiments of the ring of this invention.
Figure 2:
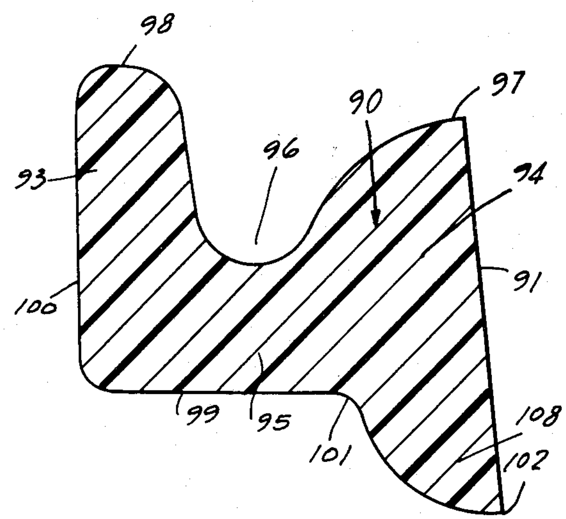
FIG. 2 is a cross-sectional view of the embodiment illustrated in FIG. 1.

FIGS. 1 and 2 illustrate one preferred form of piston ring of this invention which is inserted in an especially cut ring groove. The ring 90 has an outer diameter face 91 adapted to contact the cylinder bore wall, thereby providing an oil scraping lip.

The ring has a radially inner axially extending portion 93 which is integral with a radially outer portion 94 through the radially extending bottom portion 95. A groove 96 extending into the ring from the top thereof separates the inner portion 93 from the outer portion 94. The top 97 of the radially outer portion at the front face 91 is below the top 98 of the radially inner portion and the axial top surface of the radially outer portion 94 has an arcuate slope from the point 97 to the groove 96. The bottom 99 of the ring 90 extends radially outward from the back wall 100 to a point 101 beyond the groove 96. Thereafter, the bottom tapers arcuately axially downward and outward to the front face 91 so that the bottom portion of the radially outermost portion 94 extends axially beyond and below the remainder of the ring. The scraping face 91 is tapered radially inward from the bottom 102 to the top 97 thereof.

The piston groove 105 is a rectangular groove having a height slightly greater than the height of the radially inner portion 93 of the ring 90. A secondary stacked portion 106 of the groove 105 receives the axially extended bottom portion of the radially outer portion 94. The portion 106 of the groove is arcuately cut from the bottom 107 of the rectangular groove at the outer diameter thereof. The portion 106 is cut radially into the piston a distance slightly less than the thickness of the lip portion 108 of the ring formed by the bottom of the radially outer portion 94. In this manner, the portion 108 projects out of the ring groove to a point where it may contact the cylinder wall.

The back wall 100 of the ring 90 preferably bottoms against the back wall 100*a* of the ring groove 105.

When high pressure compression gases flow into the ring groove 105 as illustrated by the arrow 109, they will encounter the groove 96 where they will act to expand the radially outer portion 94 of the ring 90. This will press the face 91 against the cylinder wall. The taper of the face 91 allows the axially upper portion of the ring to be expanded against the cylinder wall when high-pressure gases are present in the groove 96. The pressure of the compression gases will also act in the groove 96 of the ring 90 to radially expand the same whereby the back wall 100 of the ring 90 will be forced into sealing engagement with the back wall 100*a* of the ring groove 105. The contact between the cylinder wall and the axially lower portion of the scraping face 91 allows the ring to function as an oil scraping ring. The presence of high pressure gases in the groove 96 will increase the contact pressure between the face 91 of the ring 90 and the cylinder wall. As the pressure in the groove 96 increases, the portion of the front face 91 of the ring 90 contacting the cylinder wall will increase as the ring 90 is circumferentially expanded. In this manner the ring 90 functions as an anti-blowby ring in that it seals escape paths through the ring groove 105 by contact with the axial end walls of the ring groove 105 and by sealing engagement with the back wall 100*a* of the groove. Further blowby between the piston head and the cylinder wall is minimized due to the expansion pressure contact between the outer diameter face 91 of the ring 90 and the cylinder wall. In order to aid in effectuating this seal, the ring groove 105 is preferably equal to or just slightly greater than the height of the inner diameter portion 93 of the ring groove 90 so that the top 98 thereof may contact the axial end of the ring groove in response to the pressure of gases in the groove 96 when the back wall 100 of the ring 90 is bottomed against the back wall 100*a* of the ring groove.

Figure 3:
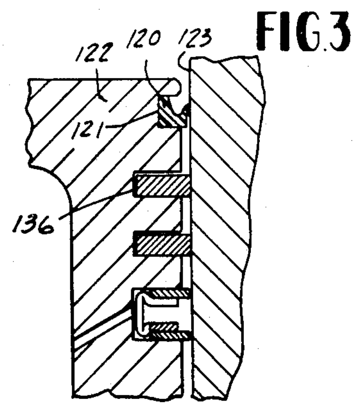
FIG. 3 is a fragmentary cross-sectional view of the ring area of a piston received in a cylinder, illustrating one embodiment of the continuous ring of this invention utilized for blowby control.
Figure 4:
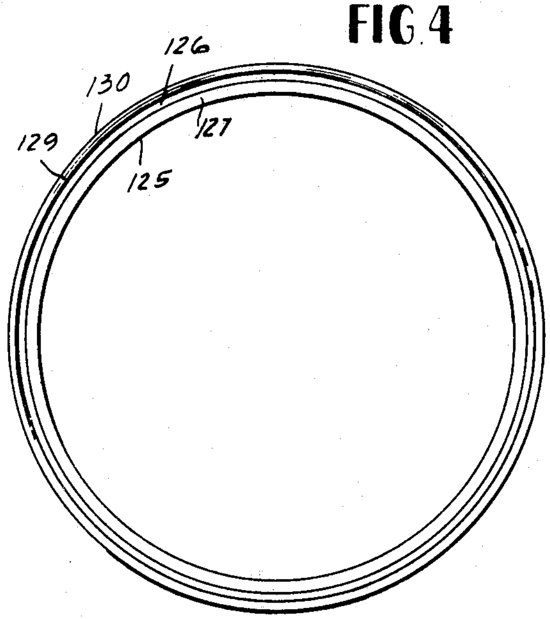
FIG. 4 is a top plan view of the ring illustrated in FIG. 3.
Figure 5:
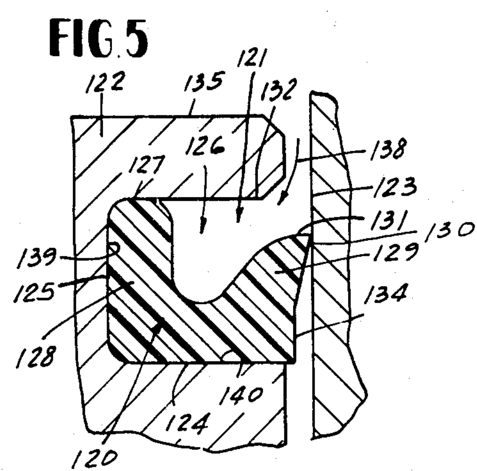
FIG. 5 is a fragmentary enlarged cross-sectional view of the top ring groove of FIG. 3, illustrating the ring.

FIGS. 3 through 6 illustrate another embodiment of the plastic piston ring of this invention. FIG. 3 illustrates the ring 120 received in a special top ring groove 121 in a piston 122. A portion of the ring rides against the cylinder wall 123.

The ring 120 is an annular continuous plastic piston ring having a flat bottom or axial end 124 and a straight axially extending back wall 125. An axially extending groove 126 projects into the ring from the top 127 thereof, dividing the ring into a radially inner portion 128 and a radially outer portion 129. The radially outer portion 129 terminates at its outer diameter with a cylinder wall engaging portion 130. The axial top end 131 of the radially outer portion 129 is below the top 127 of the radially inner portion 128 and is spaced from the top side wall 132 of the piston groove 121. The axial height of the ring 120 at the radially inner portion is approximately the same as the height of the groove. In this manner, the upper portion of the radially outer portion serves as a sealing lip with the bottom axial portion thereof cut back as at 134 to a reduced diameter portion so that the cylinder engaging portion 130 projects radially beyond the remainder of the ring.

The groove 121 is in close spaced relation to the top 135 of the piston 122 and is located above the normal position of the top ring groove 136 of a standard piston. The ring 120 serves as an anti-blowby ring reducing harmful exhaust emissions as well as preventing entrance of uncombusted fuel and oxygen mixtures into the space between the cylinder wall 123 and the piston 122 where they would normally not be combusted due to the smallness of the area.

In addition, the ring acts in the same manner as previously described rings. As high pressure combustion gases force their way between the top of the piston and the cylinder wall, they are entrapped in the groove 126 as indicated by the arrow 138. Their effect upon the groove will be to force the inner diameter portion 128 tightly against the back 139 of the piston groove and to force the bottom wall 124 of the ring against the bottom wall 140 of the groove, thereby preventing escape of gases around the ring in the groove. Further, they will force the cylinder wall engaging portion 130 of the outer diameter portion 129 tighter against the cylinder wall 123 thereby cutting off flow at the outer diameter. In the absence of high pressure gases in the groove 126, the contact between the ring and the cylinder wall will be less thereby reducing friction. Therefore, contact between the cylinder wiping portion 130 and the cylinder wall 123 will be greatest during the power and compression strokes and smallest during the intake stroke. During the exhaust stroke, there will be a slight expansion effect on the ring.

Figure 6:
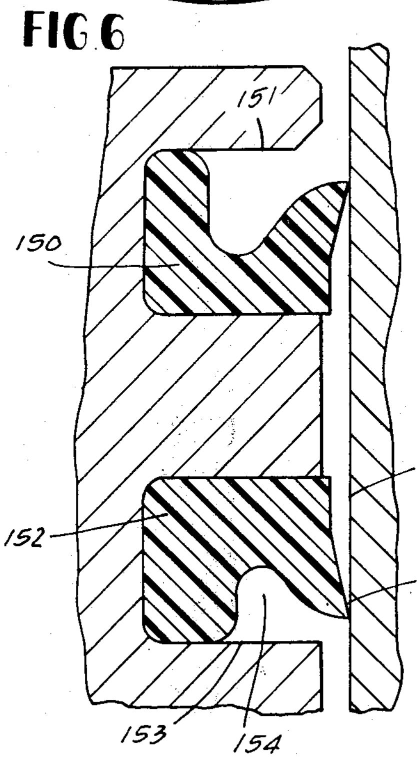
FIG. 6 is a fragmentary cross-sectional view of the ring grooves of a modified piston illustrated as received in a cylinder wall and showing other combination uses for the ring of this invention.

FIG. 6 illustrates a dual ring, dual groove arrangement where one of the rings 150 identical to the ring 120 is inserted in a top groove 151 identical to the groove 121. A secondary ring 152 which may be identical to the rings 150 and 120, or which may be illustrated having a shallower groove 154, is inserted in a lower ring groove 153. This ring acts as an oil control ring with the cylinder engaging lip 155 acting against the cylinder wall 156 to wipe excess oil therefrom and to prevent excess amounts of oil from being forced upwardly to the upper reaches of the cylinder where they could be combusted to form hydrocarbon deposits on the cylinder wall.

Figure 7:
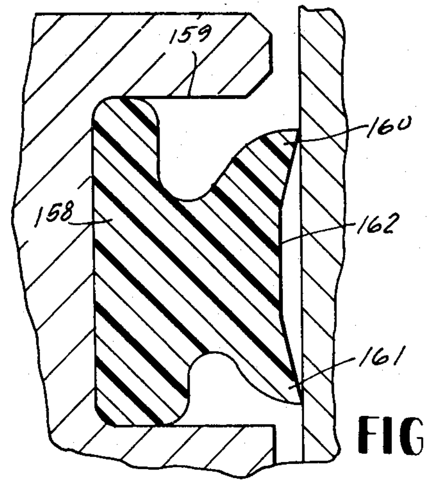
FIG. 7 is a fragmentary cross-sectional view of a ring groove of a modified piston received in the cylinder, illustrating another embodiment of this invention.

FIG. 7 illustrates a single ring 158 received in a wider top piston ring groove 159. The single ring 158 functions as a combination of the rings 150 and 152 and has two axially spaced cylinder engaging lips 160 and 161 separated by a reduced diameter portion 162 which does not normally contact the cylinder wall. In this embodiment, the lower lip 161 functions as an oil control lip while the upper lip 160 functions in the manner of the cylinder engaging portion 130 of the ring 120.

Efficiency of the several plastic rings disclosed herein is enhanced by having the axial thickness of the common connecting central portion between the radially inner portion and the radially outer portion of the ring of an axial thickness about one-half or less of the maximum axial width of the ring, and by having the wall of the outer portion which is spaced from the adjacent piston groove axially facing wall of a convexly curved shoulder form extending from the free end of the outer portion into the bottom of the groove whereby to facilitate high pressure gas flow thereover into the groove. The convex shoulder provides the outer portion with progressively increasing thickness from the free end into the groove whereby to improve the action of the ring in the presence of high pressure gas.

It can therefore be seen from the above that our invention provides an improved plastic piston ring which reduces the exhaustion of harmful internal combustion engine emission products by reducing gas blowby between the piston and the wall of the cylinder in which the piston operates. The standard can directly engage the cylinder wall with a given standard pressure and in the presence of high-pressure gases will contact the cylinder wall with a greater pressure while at the same time sealing the groove in which it is received to prevent internal groove blowby.

Although the teachings of our invention have herein been discussed with reference to specific theories and embodiments, it is to be understood that these are by way of illustration only and that others may wish to utilize my invention in different designs or applications.

We claim as our invention:

1. In combination with a piston received in a piston cylinder, the piston having a ring-receiving groove with a stepped bottom radial wall:

a ring of resilient plastic material having inner and outer diameters and an axial thickness;

an axially extending groove projecting into said ring from the axial end thereof intermediate the inner and outer diameters and said axially extending groove dividing said ring into radially inner and radially outer portions integrally connected through a central portion at the bottom of the axially extending groove;

one axial end of the radially inner portion adjacent to said axially extending groove extending axially beyond the corresponding end of the radially outer portion;

the other axial end of the radially outer portion extending beyond the corresponding end of the radially inner portion;

and the bottom of said plastic ring received in the stepped bottom of the ring-receiving groove with said other axial end of the radially outer portion received in the stepped portion of the ring-receiving groove;

portions of said other axial end extending radially beyond said piston and contacting the wall of said cylinder.

2. The combination of claim 1 wherein the said plastic piston ring is a 360° continuous ring.

3. A piston and piston ring combination for use in internal combustion engines comprising: a piston having at least one ring groove therein, said ring groove extending radially into said piston from the periphery thereof and bottoming in said piston, said ring groove having top and bottom radially extending walls, said top wall being substantially flat, said bottom wall being substantially flat and terminating in spaced relation to the periphery of the piston in a terraced groove, said terraced groove cut into the periphery of the said piston axially beyond the said bottom wall and extending from said bottom wall to said periphery, a plastic piston ring in said groove, said plastic piston ring having an inner diameter portion and an integral outer diameter portion, said inner diameter portion having an axial height substantially equal to the axial distance between the top and bottom walls and positioned therebetween, said outer diameter portion having a top terminating in spaced relation from the top wall of the ring groove and a portion extending axially beyond the bottom of the said inner diameter portion substantially filling the said terraced groove, a central portion of said piston ring having a top terminating below the tops of the inner and outer diameter portions.

4. The combination of claim 3 wherein the said plastic piston ring has portions of its outer diameter portion extending radially beyond the ring groove and the outer diameter face of the said piston ring is axially tapered.

5. The combination of claim 4 wherein the outer diameter face of the said plastic piston ring rides against the wall of a piston cylinder in which the piston is received, the ring being resilient and responsive to pressure in the area above the said central portion between the said inner diameter and outer diameter portions to circumferentially expand the said outer diameter portion whereby the area of the outer diameter face contacting the cylinder wall is increased.

6. The combination of claim 5 wherein the inner diameter of the said plastic piston ring bottoms against the bottom wall of the piston ring groove in which it is received.

7. The combination of claim 6 wherein the contact pressure between the inner diameter of said plastic piston ring and the bottom of said piston ring groove increases in dependent response to the presence of high-pressure fluid in the said ring groove.

8. A combination piston and piston ring for use in internal combustion engines comprising: a piston having at least one ring groove extending radially into the piston from the periphery thereof, said ring groove having a first axial height at the periphery of the piston which diminishes radially inwardly of the piston to a second axial height intermediate the radial ends of the groove, a 360° continuous plastic piston ring received in said groove, said ring having an axially extending groove projecting thereinto from an axial end thereof intermediate the inner and outer diameters thereof separating the said ring into inner and outer radial portions integrally connected through a central portion, the radially outer portion terminating in spaced relation from a side of said ring groove whereby the said axially extending groove communicates with the periphery of the said piston, and portions of the radially outer portion extending axially beyond portions of the radially inner portion.

* * * * *